(12) United States Patent
Borofsky et al.

(10) Patent No.: US 7,627,553 B1
(45) Date of Patent: Dec. 1, 2009

(54) CUSTOM QUERIES FOR SEGMENTATION

(75) Inventors: Susan Jamie Borofsky, Cary, NC (US); Larry L. Terhune, Fuquay-Varina, NC (US); Michael Chaves, Cary, NC (US); Jason Allen Stone, Holly Springs, NC (US)

(73) Assignee: Teradata US, Inc., Miamisburg, OH (US)

( * ) Notice: Subject to any disclaimer, the term of this patent is extended or adjusted under 35 U.S.C. 154(b) by 397 days.

(21) Appl. No.: 10/753,900

(22) Filed: Jan. 7, 2004

(51) Int. Cl.
*G06F 17/30* (2006.01)

(52) U.S. Cl. .................... 707/3; 707/4; 707/5; 705/10; 705/14

(58) Field of Classification Search ............... 707/3, 707/4, 5; 705/10, 14
See application file for complete search history.

(56) References Cited

U.S. PATENT DOCUMENTS

| | | | | |
|---|---|---|---|---|
| 5,671,404 A | | 9/1997 | Lizee et al. ................ 707/5 |
| 5,966,695 A | * | 10/1999 | Melchione et al. ........... 705/10 |
| 6,029,165 A | * | 2/2000 | Gable ........................ 707/3 |
| 6,151,584 A | * | 11/2000 | Papierniak et al. ........... 705/10 |
| 6,195,653 B1 | | 2/2001 | Bleizeffer et al. ............ 707/2 |
| 6,397,207 B1 | | 5/2002 | Bleizeffer et al. ............ 707/2 |
| 6,480,836 B1 | * | 11/2002 | Colby et al. ................ 707/3 |
| 6,519,859 B2 | | 2/2003 | Beshires .................... 33/265 |
| 7,080,066 B1 | * | 7/2006 | Scheurich et al. ............ 707/3 |
| 2003/0220917 A1 | * | 11/2003 | Copperman et al. ........... 707/3 |
| 2004/0103017 A1 | * | 5/2004 | Reed et al. ................. 705/10 |

OTHER PUBLICATIONS

Hongzhi Wang et al.; "An Effective Wrapper Architecture to Heterogeneous Data Source"; Proceedings of the 17th International Conference on Advanced Inforamtion Networking and Applications (AINA '03); 2003 IEEE; pp. 1-4.*

Hemamalini Suresh; "Csutomer Relationship Management, An Opportunity for Competitive Advantage"; Sep. 2002; pp. 1-11.*

* cited by examiner

*Primary Examiner*—Apu M Mofiz
*Assistant Examiner*—Monica M Pyo
(74) *Attorney, Agent, or Firm*—Schwegman, Lundberg & Woessner P.A

(57) ABSTRACT

Methods, systems, and data structure custom queries for segmentation. Queries are imported into a segmentation tool and modified. The queries are associated with data sources that are not mapped within the segmentation tool. Parts of the queries are manually supplied or imported into the segmentation tool and parts of the queries are automatically generated based table and key selections associated with a customer hierarchy. When the custom queries are executed the query results provide customer segmentations for desired marketing campaigns.

7 Claims, 3 Drawing Sheets

CUSTOM QUERIES FOR SEGMENTATION

FIELD OF THE INVENTION

The present invention relates to Customer Relationship Management (CRM), and more particularly to techniques for using custom queries to generate customer segmentations for marketing campaigns.

BACKGROUND OF THE INVENTION

CRM is becoming increasingly important in today's economy, where customers can choose from a variety of competing goods and services. Consequently, enterprises have developed elaborate databases and techniques to better understand their customers and keep their customers satisfied.

A variety of off-the-self CRM software utilities exist in the industry which permit the collection, organization, and analysis of customer transactions and interactions with an enterprise. Some of these utilities interface with data warehouses, which organize and index customer data and provide tools for accessing and analyzing the data.

One task an enterprise concerns itself with is identifying a target customer population for a designed marketing campaign. This task is often referred to as customer segmentation. CRM utilities and tools permit enterprise's to define market campaigns and develop related search queries that can automatically define the customer segmentations, which are the objects of the campaign.

These conventional CRM tools have predefined databases, schemas, and other metadata related to an enterprise's particular environment, which are manipulated and used when creating and defining marketing campaigns and customer segmentations. If new sources of data are relevant to resolving customer segmentation, then these new sources of data must be manually integrated and mapped within the tools. In many cases this is not an optimal situation, especially when the timeliness of customer segmentation is of vital concern to an enterprise.

Consequently, many business analysts will attempt to create needed customer segmentations outside the confines of existing CRM tools, when these segmentations are dependent on sources of data which have not yet been mapped to the CRM tools. This results in ad hoc approaches throughout an enterprise that are not re-usable, results in many manual errors, and results in undesirable time delays, since the business analysts must figure out how to integrate the customer segmentations back into the existing CRM utilities once acquired.

Therefore, there is a need to create improved techniques for generating customer segmentations for marketing campaigns, when data sources associated with the segmentations are not pre-mapped within existing CRM segmentation tools and utilities.

SUMMARY OF THE INVENTION

In various embodiments of this invention custom queries for segmentation are generated, used, and managed within existing CRM segmentation utilities. More specifically, a method for custom query generation is provided. Initially, a query is received within a segmentation tool. Next, key and table selections are received for the query. The query is directed to one or more data sources not mapped within the segmentation tool. The query is modified using the key and table selections and a custom query generated based on the query and the modifications. When custom query is executed within the segmentation tool a customer segment for a marketing campaign is generated.

In still another embodiment of the present invention, a custom query for segmentation system is described. The custom query for segmentation system includes a segmentation tool and a custom query interface. The segmentation tool generates customer segmentations for marketing campaigns. Further, the custom query interface is integrated into the segmentation tool. Moreover, the custom query interface generates custom queries for data sources which are not mapped in the segmentation tool. The custom queries execute from the segmentation tool and generate the customer segmentations defined by results of the custom queries.

In another embodiment of the present invention, a custom query data structure for segmentation is taught. The custom query data structure includes a key, user-supplied query logic, and automatically generated query logic. The user-supplied query logic is directed to data sources that are not mapped in the segmentation tool. The key is for data elements of a table associated with a customer hierarchy. The automatically generated query logic is based on the key. The key, user-supplied query logic, and automatically generated query logic form a custom query, which when executed from the segmentation tool generates a customer segmentation for a marketing campaign.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims and their equivalents.

As used herein a "segmentation tool" is any existing or custom developed CRM-related software system or application that permits a business analyst to generate a customer segmentation (segmentation) for a desired marketing campaign. The segmentation tool may interface with a data warehouse or other CRM-related tools (e.g., Online Analytical Processing (OLAP) tools, and the like).

In generating the needed segmentation, a query is developed that satisfies one or more of the constraints defined in the marketing campaign. That query executes against data sources (e.g., data warehouses, data bases, files, etc.). In the embodiments of this invention, at least one of the needed data sources for executing the query is not pre-mapped and available within the segmentation tool. Conventionally, an unmapped data source would need to be first mapped in the segmentation tool before it would be available for use within the segmentation tool. Therefore, the embodiments of this invention modify existing or custom developed segmentation tools according to the teachings presented herein and below, such that queries can be used that utilize unmapped data sources within the segmentation tools.

Modified segmentation tools include at least two new options, the first option is for creating, selecting, or executing queries associated with mapped data sources; and the second option is for creating, defining, or executing custom queries associated with unmapped data sources. A custom query is one that requires a data source that is not pre-mapped within the segmentation tool. By pre-mapped it is meant that the data elements of a data table associated with an unmapped source is not known and available to the interfaces of the segmentation tool. Thus, the data elements are not displayed and selectable and, hence, in conventional segmentation tools not available for search queries that generate customer segmentations for marketing campaigns.

One embodiment of the invention is implemented within Teradata CRM Segmentation products which use the Teradata data warehouse. The Teradata CRM Segmentation products and the Teradata data warehouse are distributed by NCR Corporation of Dayton, Ohio.

Figure 1:
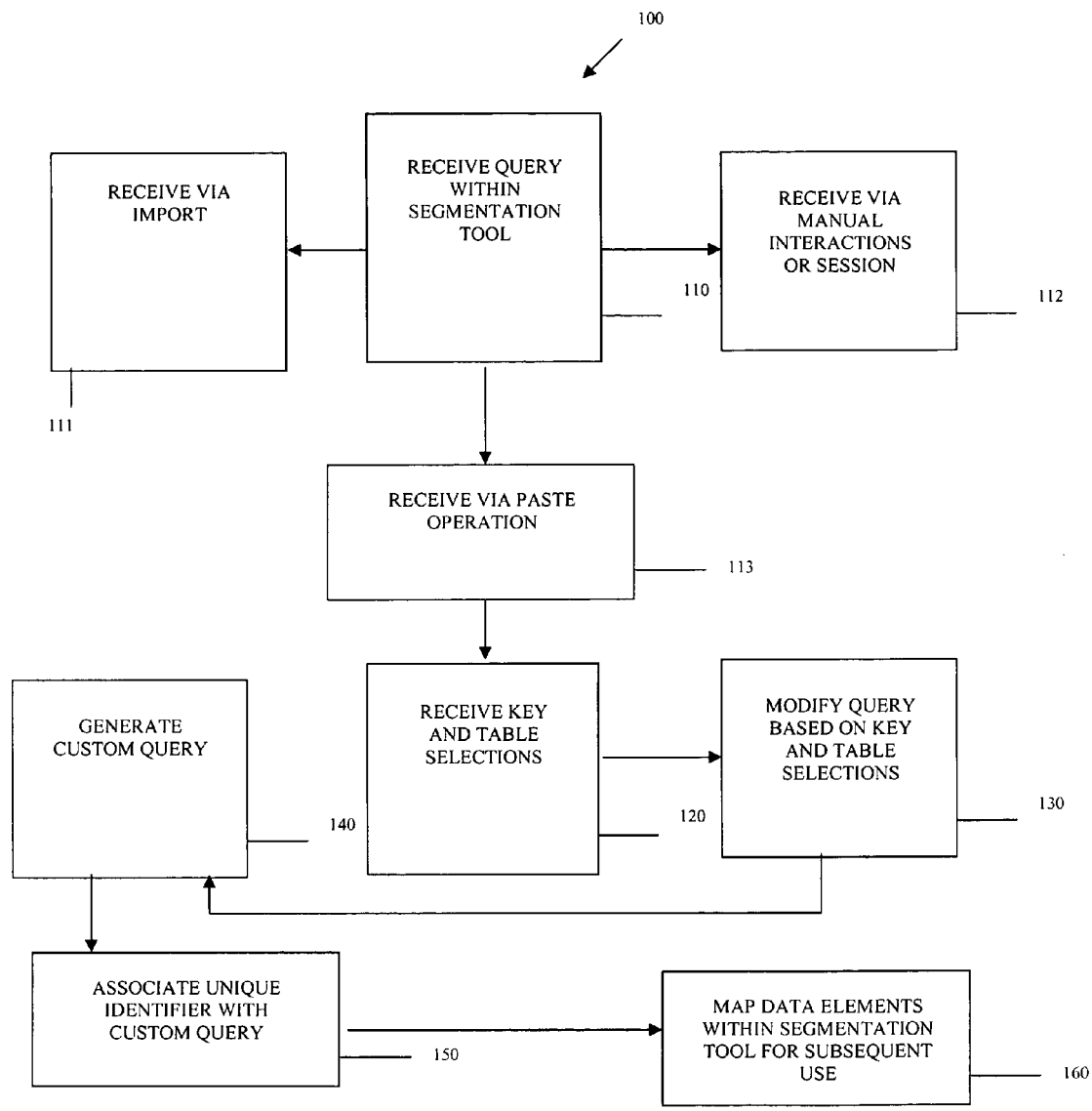
FIG. 1 depicts a flow diagram representing a method for generating a custom query for segmentation.

FIG. 1 is a flow diagram representing one method 100 for custom query generation. The method 100 is implemented in a computer-readable medium and is accessible over a network. In one embodiment, the processing of the method 100 is implemented as a sub-interface embedded within a CRM segmentation tool. In another embodiment, the processing of the method 100 is implemented within the processing logic of remote service, where the remote service provides features associated with a CRM segmentation tool.

Initially, a business analyst of an enterprise determines that a marketing campaign is needed to satisfy one or more business goals of the enterprise. During the development of that marketing campaign the business analyst will determine that a certain customer population is needed for the campaign. That customer population is the customer segmentation and is often acquired via an electronic search query against one or more data sources (e.g., data warehouse, database, etc.).

Conventionally, if the business analyst determines that the data sources are associated with data sources that are not presently mapped within a segmentation tool, then the business analyst would have to either have the data sources mapped into the segmentation tool or elect to create an ad hoc query outside the scope of the segmentation tool and latter attempt to reconcile the query back into the marketing campaign within the segmentation tool and other CRM utilities of the enterprise. Moreover, in some instances the data sources may be output data generated from another application that the business analyst is using. In these instances, the output data is also conventionally not available within the segmentation tool for performing search queries against in order to generate customer segmentations.

However, with the embodiments of this invention data sources from unmapped sources or from output of other applications can be queried in order to generate customer segmentations marketing campaigns. Moreover, this custom query can be generated and used within the segmentation tool. To do this, the segmentation tool is modified to provide an option that permits custom queries to be entered.

When this custom query option is selected, the business analyst or user is presented with an interface screen that is capable of receiving inputs from the business analyst and developing a custom query according to the processing presented in the method 100. The interface that is integrated into the segmentation tool is a segmentation query-build interface. The segmentation query-build interface is adapted to plug into and interface with the segmentation tool.

Accordingly, at 110, a query is received from within a segmentation tool via the segmentation query-build interface. That query is associated with data sources that are not mapped within the segmentation tool. A portion of the query is provided to the segmentation tool and a portion of the query is automatically generated by services that process within the segmentation query-build interface. The business analyst can provide a portion of the query needed for defining a custom segmentation of a marketing plan to the segmentation tool in a variety of manners.

For example, at 111, the query can be pre-existing within an electronic file (e.g., text, word processing document, spreadsheet, image, etc.). This electronic file can then be imported directly or indirectly into the segmentation tool. The import can be a direct import in cases where the electronic file is in a text format. The import may be indirect when additional conversions or processing is needed to properly include the query data in the segmentation query-build interface. For example, if the electronic file being imported is in a word processing format the import may trigger a number of other operations, which convert the data into a text format (or a format required by the segmentation query-build interface). If the electronic file is an image, then processes may perform optical character recognition (OCR) and then import the query data into the segmentation query-build interface.

Alternatively, at 112, an editing session within the segmentation query-build interface can be provided, such that the query can be manually entered during an interactive query editing session. This session would be similar to a basic word processor session, where the query syntax is directly entered by a business analyst.

In still other cases, at 113, the query can be supplied to the segmentation query-build interface via a paste operation. In this way, the business analyst can cut and paste the query contents directly into the segmentation query build interface.

In yet another case, the query may have been previously saved within the foldering system of the segmentation tool for latter reuse. In these instances, the query can be recalled and loaded within the segmentation query-build interface and edited or used in an unedited fashion.

At 120, the segmentation query-build interface receives selections for select keys and tables associated with a customer hierarchy, which is ultimately the object of the customer segmentation. These are hierarchical keys that are being used within the search query for targeted tables of a customer hierarchy. When the business analyst makes these selections, the segmentation query-build interface generates an additional portion of the custom query, which is being generated. This additional portion includes system generated query statements that are used to make the custom query properly execute within the environment of the segmentation tool in order to construct the segmentation from the existing customer hierarchy. In one embodiment, this additional portion is one or more outer level or wrapping SQL "where clause" statements for the tables and keys that were selected by the business analyst.

The segmentation query-build interface includes the customer hierarchy keys and tables as selection items for the business analyst. This is mapped metadata information associated with the customer data store, which contains customer identification information. The data elements are displayed for selection and permit the custom query to acquire customer identifiers or other identifying information needed to construct the segmentation from the customer hierarchy.

The selected keys and tables permit a wrapper of generic query logic to be automatically generated for the query being built. This wrapper integrates the query results with the customer hierarchy and permits the query to properly generate or map the segmentation from the search results that are returned from the query when the query is executed. In other words, the results from the query supplied in the segmentation query-build interface need to be mapped or integrated with the customer hierarchy in order to provide the segmentation within the segmentation tool. The selection of the keys and table and the generation of the wrapping query logic that augments the query within the segmentation query-build interface provide this ability.

Correspondingly, at 130, the original supplied query into the segmentation query-build interface is modified based on the key and table selections that are mapped to the customer hierarchy. As was discussed above, this modification includes adding query logic as an outer wrapper to the supplied query logic which provides the proper integration within the segmentation tool to provide the segmentation that is returned as a result of executing the supplied search query. This additional query logic which is added is not modifiable by the business analyst, it can only be modified by the segmentation query-building interface when the business analyst's changes key or table selections made within the segmentation query-building interface.

At 140, after the key and table selections were made and the supplied query modified, the custom query is generated, which includes the modifications made based on the key and table selections. At this point, the custom query is capable of being executed from within the segmentation tool and returning search results that define segmentation for a desired marketing campaign. Moreover, at this point, the custom query can be associated with a unique identifier at 150; the identifier can be a label, number, or combination of label and number. The identifier permits the custom query to be recalled from within the segmentation tool and subsequently used one or more additional times within the segmentation tool.

Additionally, in some embodiments, at 160, the data elements and tables associated with the custom query can actually be mapped data sources, at some latter point in time, such that they are subsequently available within the segmentation tool. In these embodiments, the custom query may no longer be needed or may be further modified to reflect the fact that no additional integration to the customer hierarchy is needed with wrapper query logic in order to properly produce the desired segmentation.

The embodiments of the method 100 permit business analysts to create custom queries for purposes of generating customer segmentations within a segmentation tool, when one or more of the data sources associated with the custom query are not mapped within the segmentation tool. Conventionally, this could not be achieved and business analysts were forced to manually create segmentations for some marketing campaigns both inside a segmentation tool and outside a segmentation tool. This has heretofore been confusing, inefficient, and a wasteful use of resources. With the teachings of this invention, custom queries can now be efficiently and seamlessly integrated in segmentation tools by implementing segmentation query-building interfaces which implement the processing of the method 100 and which are integrated into the segmentation tools.

Figure 2:
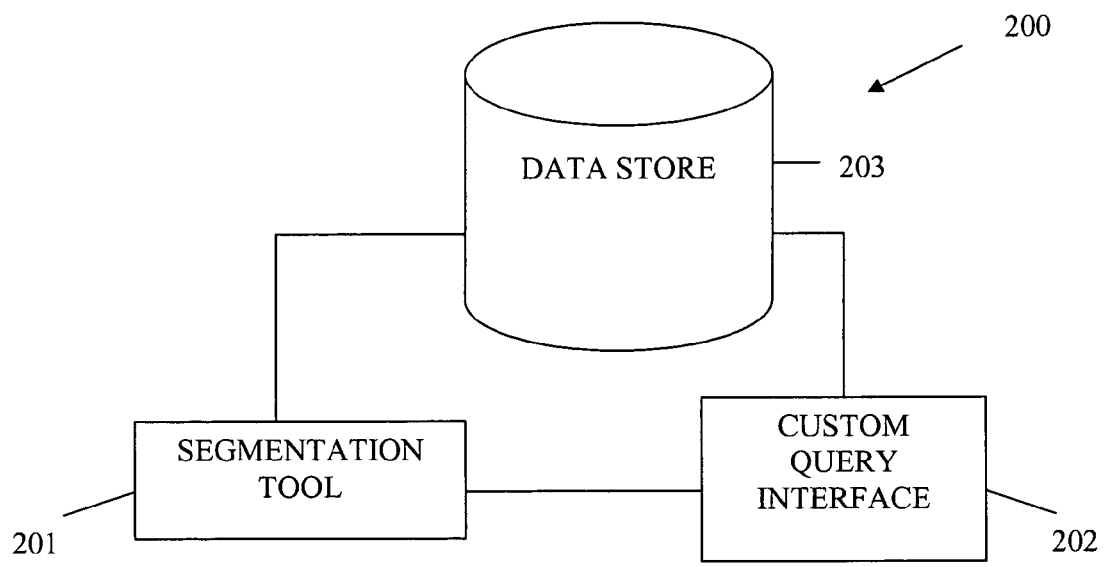
FIG. 2 depicts a diagram of a custom query for segmentation system.

FIG. 2 is a diagram of a custom query for segmentation system 200. The custom query for segmentation system 200 is implemented within a computer-readable or accessible medium. In some embodiments, the system 200 is a modification made to existing and conventional segmentation tools, where a custom query interface 202 is added to the system 200 in order to permit custom queries to be processed within the segmentation tool 201.

The custom query for segmentation system 200 includes a segmentation tool 201 and a custom query interface 202. The system 200 may also optionally interface with one or more data stores 203. The data stores can be databases, data warehouses, and/or electronic files.

The segmentation tool 201 is a CRM-based tool that permits business analysts to develop marketing campaigns and generate customer segmentations that are relevant and needed for those marketing tools. In some embodiments, the CRM segmentation tool 200 is any existing conventional segmentation tool which is augmented to include the features of the custom query interface 202.

The custom query interface 202 is integrated into the segmentation tool 201 and is capable of generating custom queries to generate segmentations based on tables, data elements, or other data sources that are not mapped within the segmentation tool. By mapped it is meant that the metadata associated with unmapped data sources is not loaded or known to the segmentation tool 201 for purposes of normal and conventional query interfaces within the segmentation tool 201. Conventional segmentation tool queries, which are directed toward unmapped data sources, are not permissibly executable within the environments of the conventional segmentation tools. However, the segmentation tool 201 of the present invention is capable of executing these types of queries via the custom query interface 202.

The segmentation tool 201 includes two query options that can be selected by a user or business analyst. The first option is for executing a query were the data sources are known and mapped within the segmentation tool 201. The second option is for executing and calling the custom query interface 202. When this second option is executed the custom query interface 202 begins processing.

The custom query interface 202 is designed to receive a custom query through a variety of techniques. For instance, the custom query can be received via manual input and interactions that occur with the user or business analyst during a session. Alternatively, the custom query can be imported from a file or selected from the filing system folders accessible to the segmentation tool 201 (e.g., file open operation for a previously saved file or for a file available within the environment of the segmentation tool 201). The custom query can also be pasted in whole or in part from a system buffer.

Once the custom query is inputted into the custom query interface 202, the custom query interface 202 permits and displays keys and/or tables that contain mapped customer hierarchy information and from which the custom query can acquire the segmentation information that it desires, when it is executed. The business analyst selects one or more of the keys or tables, and the custom query interface 202 generates additional query logic which is appended to custom query.

This additional query logic cannot be modified directly by the business analyst, rather, the custom query interface 202 directly modifies the additional query logic when the business analyst selects or changes selections associated with the keys or tables. The additional query logic serves as a wrapper within the environment of the segmentation tool 201 such that when the custom query executes the appropriate identifying information from the customer hierarchy is acquired to satisfy the segmentation.

Once the proper keys and tables are selected then the custom query is completely generated from within the custom query interface 202 and can be executed. In some embodiments, the custom query interface 202 includes options to save the custom query. In this way, the custom query can be reused and reacquired during subsequent sessions with the custom query interface 202. In more embodiments, documentation can be associated with the custom query and an option is available within the custom query interface 202 which will display the documentation so that a subsequent user of the custom query can fully appreciate the effects and segmentation that the custom query is designed to produce when executed.

Figure 3:
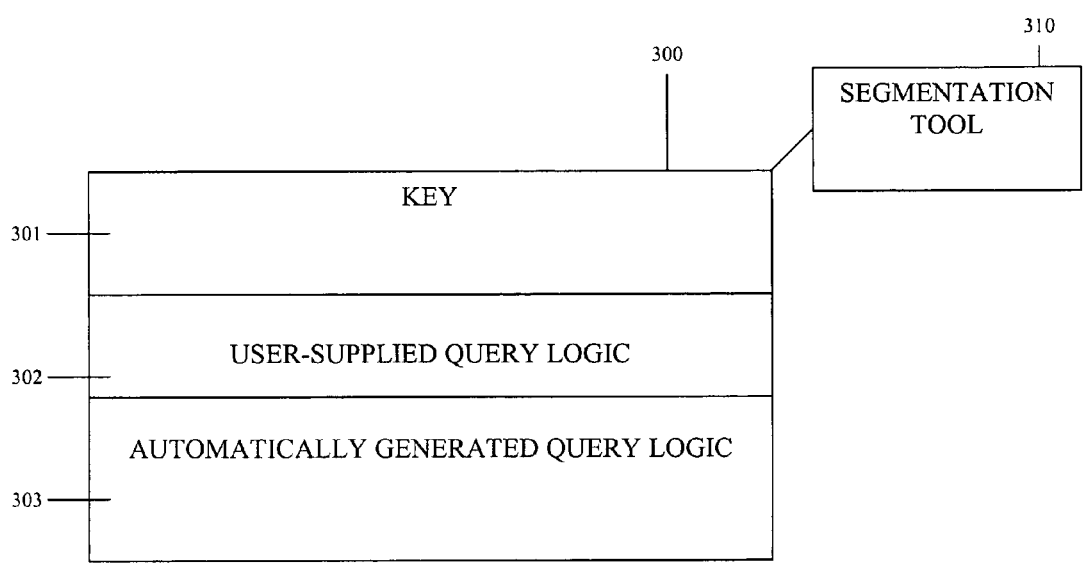
FIG. 3 depicts a custom query data structure.

FIG. 3 is a custom query data structure 300. The custom query data structure 300 is implemented in a computer-readable medium and is used as a search request to one or more sources which are not mapped within a segmentation tool 310.

The custom query data structure 300 includes a key 301, user-supplied query logic 302, and automatically generated query logic 303. The key 301 is selected from within a custom query interface of a segmentation tool 310. The key represents metadata associated with a customer hierarchy, and is used with portions of the automatically generated query logic 303.

The user-supplied query logic 302 is query logic supplied by a business analyst or user and includes search logic directed to data sources which are not mapped in the segmentation tool 310. The user-supplied logic 302 can be supplied manually, imported, or pasted into a custom query tool of the segmentation tool 310.

Once a business analyst or user selects a value for the key 301, the automatically generated query logic 303 is produced. The automatically generated query logic 303 represents logic that is produced based on the selected key and it ties portions of the customer hierarchy into the custom query data structure 300 after the user-supplied query logic 302 processes. That is, the automatically generated query logic is a wrapper that provides the proper segmentation based on the results of executing an outer query that surrounds the user-supplied query logic 301. This automatically generated query logic 303 permits the custom query to integrate and process within the segmentation tool 310 even though the segmentation tool 310 does not include some of the data sources defined in the user-supplied query logic 302.

In some embodiments, custom query data structure 300 is built and populated within a custom query interface that is integrated into the segmentation tool. When the custom query data structure 300 is executed, a customer segmentation population is returned which satisfies a pre-defined marketing campaign.

The custom query data structure 300 represents an executable query that can process against data sources that are mapped and unmapped within the segmentation tool 310. In this way, custom queries can be developed and instantiated from the custom query data structure 300 and used within segmentation tools 310 even when some of the sources required for a search are not pre-mapped within those segmentation tools 310. This is an improvement over conventional approaches where there is no integration of searches within segmentation tools where those searches use data sources which are not mapped within the segmentation tools.

The above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method for custom query generation implemented in a computer-readable storage medium and processed by a computer, comprising:

receiving, by the computer, a query within a segmentation tool, wherein the query is directed to one or more data sources that are not mapped in the segmentation tool, and wherein metadata and data elements of data tables associated with the one or more data sources are unknown to the segmentation tool, unavailable, and unrecognized by query interfaces used by the segmentation tool, and wherein the query is received via an option of the segmentation tool;

receiving, by the computer, a key selection and a table selection for the query, wherein the key and table selections are associated with data elements of a customer hierarchy that is mapped within the segmentation tool to different data sources, the key selection and table selection received from the segmentation tool via selections made by a business analyst within the segmentation tool;

modifying, by the computer, the query using the key and table selections, the query modified to include an additional portion to the query, the addition portion including wrapping Structured Query Language (SQL) WHERE clause statements used to make a modified query and the modified query now identified as a custom query, the additional portion permits the results from the query when executed, as part of the custom query, to be integrated with the customer hierarchy via the SQL WHERE clause statements that execute as a wrapper within the custom query; and generating, by the computer, the custom query as the wrapper that includes the query before it was modified and the additional portion having the SQL WHERE clause statements, wherein when the custom query is executed within the segmentation tool to generate a customer segment for a marketing campaign and when the query as part of the custom query is executed the unmapped data sources are queried to get the results and then when the additional portion of the custom query is executed against the results from the unmapped data sources the SQL WHERE clause statements are executed by using the key and table selections, to acquire selective data elements from the customer hierarchy in order to produce the customer segment.

2. The method of claim 1 wherein receiving the query further includes importing a file that includes at least a portion of the query into a segmentation query-build interface.

3. The method of claim 1 wherein the receiving the query further includes interactively receiving at least some portions of the query from a user interacting with a segmentation query-build interface.

4. The method of claim 1 wherein the receiving the query further includes receiving at least a portion of the query from a paste operation into a segmentation query-build interface.

5. The method of claim 1 further comprising associating a unique identifier with the custom query, wherein the unique identifier is used to save and recall the custom query for subsequent use.

6. The method of claim 1 further comprising receiving a command to execute the custom query from within the segmentation tool.

7. The method of claim 1 further comprising mapping data elements associated with the custom query to the segmentation tool for subsequent uses.

* * * * *